Dec. 18, 1945.   K. A. KAIL   2,391,245
BALL BEARING
Filed Jan. 20, 1944   2 Sheets-Sheet 1

KARL A. KAIL.
*INVENTOR.*

BY
ATTORNEYS.

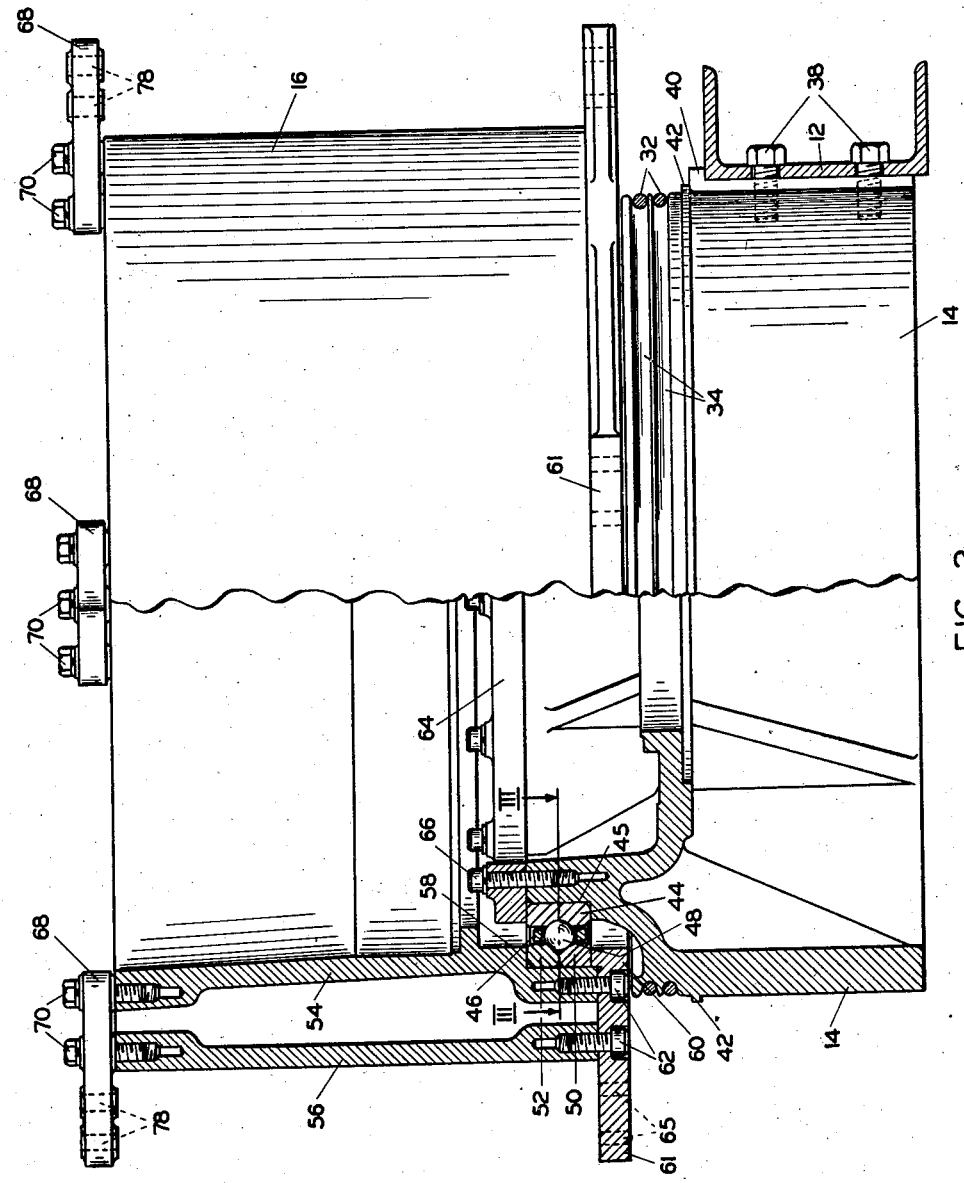

Patented Dec. 18, 1945

2,391,245

UNITED STATES PATENT OFFICE 2,391,245

BALL BEARING

Karl A. Kail, Montrose, Pa., assignor to Link Aviation Devices, Inc., Binghamton, N. Y., a corporation of New York Application January 20, 1944, Serial No. 518,983

8 Claims. (Cl. 308—201)

My invention relates to a spring loaded sectional retaining ring for a bearing, and has been found to be particularly useful in an aviation trainer of the type disclosed in the copending application of Edwin A. Link, Serial Number 493,535, filed July 5, 1943 for "Training device."

It is the principal object of my invention to provide a bearing for allowing relative rotation between a rotatable and a fixed member when the weight of the rotatable member is considerable and the power used to turn the member is of limited magnitude.

Training devices of the type mentioned in the said copending application comprise a fixed base to which is attached the lower bearing housing; a movable bearing housing is mounted above the fixed housing, and to the movable carriage is affixed a tower at the top of which is a fuselage capable of accommodating four persons. In addition counterbalancing weights and numerous other pieces of associated equipment are supported by the carriage. The result is that considerable thrust is present upon the bearing between the fixed and rotatable bearing housings.

At the same time it has been found that the best type of power for turning the carriage and associated parts of such an aviation trainer is one or more double-acting air motors, the output of which is necessarily limited.

When trainers of this type were first built the bearing used was the conventional thrust bearing having an inner and outer race and the usual one piece retaining ring for holding the balls. It was found that in operation of this arrangement that if the carriage and supported parts were turned in one direction for any length of time the bearings bound or locked and the above-mentioned turning motors were unable to further turn the trainer in that direction. However, if then the direction of the output of the turning motors were reversed, the motors were able to turn the device in the opposite direction until, after a time, the bearings again locked and the turning motors could cause no further rotation in that direction. But a reversing of the motors would again result in turning of the carriage in the opposite direction.

This behavior resulted in the conclusion that the various balls of the bearing were not all traveling at exactly the same rate, and that after enough rotation in one direction one or more of them were pressing sufficiently hard against the retaining ring to produce enough friction that the low power of the turning motors being used could not overcome the same. This difference in the rate of travel of the various balls probably could not be attributable to imperfections in the races but to an unbalance of the thrust upon the different parts of the outer race caused by changes in the weight distribution above, the result being that they were bearing on the races at different distances from the centers of rotation. These changes in thrust were caused by movements of the persons in the fuselage as well as changing the position of movable equipment carried therein.

However, the problem could not be satisfactorily solved by using turning motors having greater output because even though the motors were strong enough to overcome the previously described locking and binding, the rate of turning of the fuselage for a given position of the rudder pedals would be uneven, as a result of the locking and binding. A realistic simulation of the turning of a plane in actual flight would not be produced.

It was found that if the circular retaining ring were cut into segments and a compression spring placed between each segment and its neighbors the turning motors were able to smoothly turn the carriage and supported parts in either direction indefinitely.

In order that my invention may be better understood reference is made to the accompanying drawings wherein a preferred embodiment is illustrated, in which Fig. 1 is a general view of an aviation trainer of the type described above showing the fuselage, tower, carriage, central bearing housings, turning motors and base.

Fig. 2 is a view of the central bearing housings and bearing, part of which is shown in cross section.

Figures 1, 3:
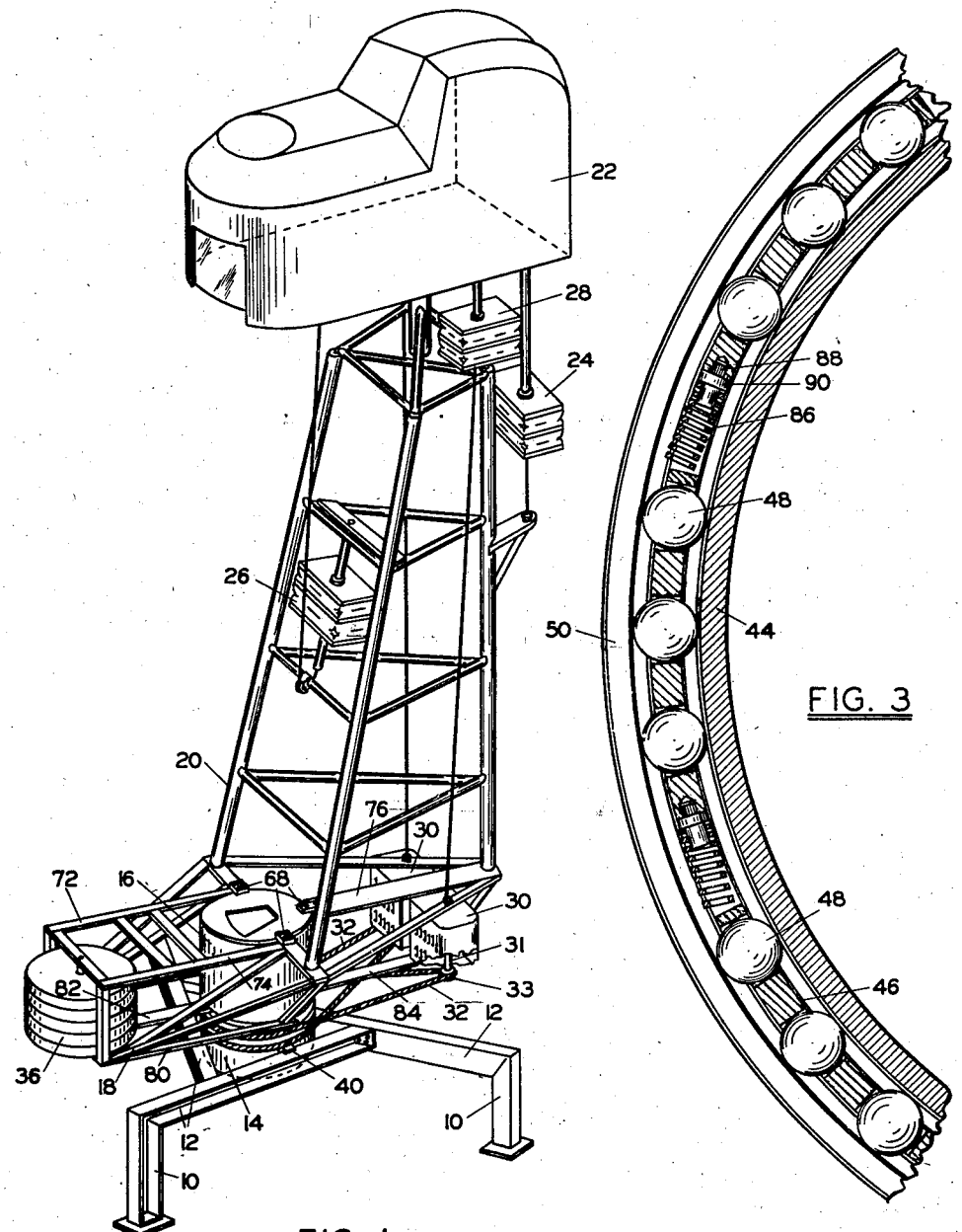
Fig. 3 is a cross sectional view of a part of the main central bearing taken in the plane of the line III—III of Fig. 2.

Reference is now made to Fig. 1 showing the base of the trainer which comprises three vertical legs 10 (only two of which are shown) and three horizontal base frame members 12. It can be seen generally that the members 12 support the stationary lower hub 14 and the upper rotatable hub 16 rests upon hub 14. The carriage 18 which comprises a plurality of frame members as shown is supported by the upper rotatable hub 16 and a tower 20 rests upon carriage 18.

Universally mounted upon the top of tower 20 is fuselage 22. Bellows 24, 26, 28 and another bellows not shown, are provided. By means of a system of vacuum, valves, linkages and controls described in United States Patents 1,825,462 and 2,099,857 the student in the trainer may cause the bellows to contract and expand so that the trainer fuselage 22 will assume a diving, climbing or banking position in simulation of the corresponding movements of a plane in actual flight.

Also shown in Fig. 1 are a pair of turning motors 30 of the type above described which are supported by carriage 18. Each of these turning motors has an output shaft 31 upon which is rigidly affixed a pulley wheel 33 (only one output shaft and one pulley wheel being shown), and each of the pulley wheels has a groove adapted to receive one of the turning belts 32. Integral with fixed lower bearing member 14 are a pair of sheaves 34, better seen in Fig. 2, and each of the turning belts 32 is placed around lower bearing member 14 and rests in one of the sheaves 34.

Whenever the student in the trainer fuselage 22 presses the simulated rudder pedals the turning motors 30 are actuated by a system of vacuum, valves and linkages and the output shaft and pulley wheel of each of the turning motors 30 are rotated, the direction of rotation depending upon whether the left or right simulated rudder pedal is pressed. In the event the left rudder pedal is pressed the motors 30 turn in a direction to cause the carriage 18 and consequently the tower and trainer fuselage 22 to turn in a counterclockwise direction as seen from above, thereby simulating the turning to the left of a plane in actual flight. A pressing of the right rudder pedal causes an opposite turning. For a detailed disclosure of the just outlined turning means reference is made to the same United States patents.

The friction between the turning belts 32 and the pulley wheels 33 on the one hand and the friction between the turning belts and sheaves 34 on the other hand prevents the belts 32 from slipping with respect to the pulley wheels or sheaves. The pulley wheels, therefore, when actuated by the motors 30, roll along the turning belts 32 carrying with them the turning motors 30, carriage 18, tower 20, fuselage 22 and associated parts.

Also seen in Fig. 1 are a plurality of weights 36 placed at the end of carriage 18 opposite turning motors 30. These weights balance the moments about the central hub along the longitudinal axis of the carriage.

Reference is now made to Fig. 2 which shows the central bearing housing 14, 16, and associated parts, partly in cross section and partly in view. It will be seen in this figure that the lower bearing housing 14 is affixed to the horizontal members 12 by means of bolts 38 and, therefore, member 14 is stationary. Between each of the members 12 and lower bearing housing 14 is a right angle bracket 40 which supports the housing 14 by means of the annular ring 42 integral with this housing. The inner race of the main bearing is designated 44 and rests in an annular shoulder 45 in the side of housing 14. The retaining ring is designated 46 and the ball bearings by 48. The outer race comprises lower and upper rings designated by 50 and 52, respectively.

Upper bearing housing 16, as seen in Fig. 2, consists of a casting having inner and outer walls 54 and 56 respectively. These walls are made integral by a plurality of webs which are not shown. The inner wall has an interior annular counterbore the shoulder 58 of which rests upon the top of upper outer race 52. The number 60 designates a flat ring with four integral lugs 61, only three being shown, and each of these lugs is rigidly affixed to the inner and outer walls 54 and 56 of the upper bearing housing 16 by means of bolts 62. It will also be seen that the inner contour of ring 60 supports the lower outer race 50 of the main bearing.

A circular plate 64 is bolted to bearing housing 14 by means of bolts 66, and as seen, bears against the top of inner race 44.

Three lugs designated 68 are also attached to inner and outer walls 54 and 56 of upper bearing housing 16 by means of screws 70. It is shown in Fig. 1 that each of the upper members 72, 74 and 76 of carriage 18 is attached to one of the lugs 68, the tapped holes 78 being provided in lugs 68 as shown in Fig. 2 to facilitate this relationship. Similarly the lower members 80, 82 and 84 of carriage 18 are affixed to the previously decribed lugs 61 which are integral with ring 60, a plurality of tapped holes 65 also being provided in lugs 61.

From the preceding discussion it will be realized that the entire weight of the trainer fuselage 22, tower 20, carriage 18, weights 36 and other associated parts rest upon upper bearing housing 16 which in turn rests upon shoulder 58 of inner wall 54 which is supported by upper outer race 52.

Referring now to Fig. 3 which is a cross sectional view of the main bearing taken in the plane of the line III—III of Fig. 2, the inner race 44, retaining ring 46, ball bearings 48 and the lower outer race 50 are shown.

It will be seen in this figure that the retaining ring 46 is not a solid annular ring but is composed of a plurality of arcuate segments designed to support three of the bearings 48. Between adjacent segments of the retaining ring 46 is placed a compression spring 86, one end of which fits over a stud 88 having a collar 90 which rests against the left end of each of the segments. One end of each of the segments is drilled so that the studs may be inserted therein up to the collars 90.

When an uneven thrust is present upon the bearing it will be understood that there are two points 180° apart at which the balls of the bearing are displaced an abnormal distance from the center of rotation. Also, there are two points 180° apart and each 90° from one of the two first mentioned points at which the bearings ride in the normal positions on the races. The unbalanced thrust by displacing certain of the balls from their normal positions on the races, will not affect the positions of certain of the balls relative to the speed of the others. The part of the retaining ring holding the faster moving balls must of necessity travel faster to prevent the above described binding, and the insertion of the compression springs as described makes this possible. Inasmuch as the rate of the trainer's turning is approximately twice as fast as the rate of movement of the balls around the races, the same balls are not always traveling at the relatively faster rate, but instead successive balls will turn at the relatively faster rate. Therefore, when the balls which at one instant are traveling at the relatively faster rate, thereby causing their retaining ring to likewise move at the relatively faster rate, come to a point where they are traveling at their normal positions in the races and therefore at the normal rate, the springs which were previously compressed are allowed to expand. Therefore, by the insertion of springs between the various sections of the retaining ring any of the balls may be made to travel at the rate demanded by the existent thrust. Locking or binding is therefore overcome.

This particular arrangement of dividing the retaining ring into segments between which are placed compression springs is the essence of my invention which has overcome the difficulties outlined at the beginning of this description when the conventional retaining ring was employed.

While this invention has been described in connection with an aviation trainer its possible use in connection with other devices is readily apparent and is intended to be covered by the following claims.

I claim:

1. A bearing comprising an outer and an inner race, a plurality of rigid circumferentially separated, arcuate segments each having a plurality of transverse openings therethrough, a ball in each of said transverse openings, and resilient means between said segments.

2. A bearing comprising an outer and an inner race, a plurality of rigid, circumferentially separated, arcuate segments each having a plurality of transverse openings therethrough, a ball in each of said transverse openings, and compressible resilient means between said segments.

3. A bearing comprising an outer and an inner race, a plurality of circumferentially separated, rigid, arcuate segments each having a plurality of transverse openings therethrough, a ball in each of said transverse openings, and compression spring means between said segments.

4. A bearing comprising an outer and an inner race, a plurality of circumferentially separated, rigid, arcuate segments each having a plurality of transverse openings therethrough, a ball in each of said transverse openings, and a spring carried by one end of each of said segments and arranged to press against the adjacent end of the adjoining segment.

5. A bearing comprising an outer and an inner race, a plurality of rigid, circumferentially separated, arcuate segments each having a plurality of transverse openings therethrough, a ball in each of said transverse openings, and compressible resilient means between said segments, the total arcuate length of said segments and said resilient means being slightly less than 360 degrees when said resilient means are uncompressed.

6. In an aviation trainer comprising a fuselage mounted for rotation with respect to a stationary base, a bearing between said relatively rotatable parts, said bearing comprising an inner and an outer race, a plurality of rigid, circumferentially separated, arcuate segments each having a plurality of transverse openings therethrough, a ball in each of said transverse openings, and resilient means between said segments.

7. In an aviation trainer comprising a fuselage mounted for rotation with respect to a stationary base, a bearing between said relatively rotatable parts, said bearing comprising an inner and an outer race, a plurality of rigid, circumferentially separated, arcuate segments each having a plurality of transverse openings therethrough, a ball in each of said transverse openings, and compression spring means between said segments.

8. In an aviation trainer comprising a fuselage mounted for rotation with respect to a stationary base, a bearing between said relatively rotatable parts, said bearing comprising an inner and an outer race, a plurality of rigid, circumferentially separated, arcuate segments each having a plurality of transverse openings therethrough, a ball in each of said transverse openings, and compressible resilient means between said segments, the total arcuate length of said segments and said resilient means being slightly less than 360 degrees when said resilient means are uncompressed.

KARL A. KAIL.